(12) United States Patent
Tonogai et al.

(10) Patent No.: US 7,867,349 B2
(45) Date of Patent: *Jan. 11, 2011

(54) THICK FILM GREEN SHEET SLURRY, PRODUCTION METHOD OF THICK FILM GREEN SHEET SLURRY, PRODUCTION METHOD OF THICK FILM GREEN SHEET AND PRODUCTION METHODS OF THICK FILM GREEN SHEET AND ELECTRONIC DEVICE

(75) Inventors: Toru Tonogai, Nikaho (JP); Shigeki Satou, Narita (JP); Hisashi Kobayashi, Nikaho (JP)

(73) Assignee: TDK Corporation, Tokyo (JP)

( * ) Notice: Subject to any disclaimer, the term of this patent is extended or adjusted under 35 U.S.C. 154(b) by 278 days.

This patent is subject to a terminal disclaimer.

(21) Appl. No.: 11/658,767

(22) PCT Filed: Aug. 4, 2004

(86) PCT No.: PCT/JP2004/011147

§ 371 (c)(1),
(2), (4) Date: Dec. 5, 2008

(87) PCT Pub. No.: WO2006/013625

PCT Pub. Date: Feb. 9, 2006

(65) Prior Publication Data

US 2009/0078358 A1    Mar. 26, 2009

(51) Int. Cl.
*C03B 29/00* (2006.01)
*C04B 35/03* (2006.01)
(52) U.S. Cl. .................. 156/89.12; 156/89.11; 501/94
(58) Field of Classification Search .............. 156/89.12, 156/89.11; 501/94
See application file for complete search history.

(56) References Cited

U.S. PATENT DOCUMENTS 4,273,845 A * 6/1981 Kobayashi et al. ............ 430/48

(Continued)

FOREIGN PATENT DOCUMENTS

DE    100 51 390 A1    5/2001

(Continued)

OTHER PUBLICATIONS

Bhattacharjee et al., Polyvinyl Butyral as a Dispersant for Barium Titanate in a Non-aqueous Suspension, Journal of Materials Science, 28, 1993, 6490-6495.*

*Primary Examiner*—Philip C Tucker
*Assistant Examiner*—Alex Efta
(74) *Attorney, Agent, or Firm*—Oliff & Berridge, PLC

(57) ABSTRACT

A thick film green sheet slurry, a production method of thick film green sheet slurry, a production method of a thick film green sheet, a thick film green sheet and a production method of an electronic device are provided; by which coating of a relatively thick film becomes possible, a sheet formed after coating has excellent cutting property (strength capable of being cut), and a sheet having high air permeability, excellent handleability and a high adhesive force can be formed. In the present invention, a thick film green sheet slurry comprises a ceramic powder, a binder resin including a butyral based resin as the main component, and a solvent: wherein the solvent includes a good solvent for letting the binder resin dissolved well therein and a poor solvent having lower solubility to the binder resin comparing with that of the good solvent; and the poor solvent is included in a range of 30 to 60 wt % with respect to the entire solvent. The good solvent is alcohol, and the poor solvent may be toluene, xylene, mineral spirit, benzyl acetate, solvent naphtha, etc.

12 Claims, 3 Drawing Sheets

U.S. PATENT DOCUMENTS

| | | | |
|---|---|---|---|
| 4,680,154 A * | 7/1987 | Matsubara et al. | 264/639 |
| 5,650,367 A * | 7/1997 | Fujikawa et al. | 501/139 |
| 6,692,598 B1 * | 2/2004 | Yamana et al. | 156/89.12 |
| 2001/0002606 A1 * | 6/2001 | Nakamura et al. | 156/89.11 |
| 2003/0201424 A1 | 10/2003 | Nakamura et al. | |
| 2004/0066603 A1 * | 4/2004 | Saito et al. | 361/302 |
| 2006/0096693 A1 * | 5/2006 | Murosawa et al. | 156/89.12 |

FOREIGN PATENT DOCUMENTS

| | | | |
|---|---|---|---|
| JP | 04325453 A * | 11/1992 | |
| JP | 10241987 A * | 9/1998 | |
| JP | A 2000-133547 | 5/2000 | |
| JP | A 2001-114569 | 4/2001 | |
| JP | A 2001-167971 | 6/2001 | |
| JP | A 2002-104878 | 4/2002 | |
| JP | A 2002-289456 | 10/2002 | |
| WO | WO 2004061879 A1 * | 7/2004 | |

* cited by examiner

THICK FILM GREEN SHEET SLURRY, PRODUCTION METHOD OF THICK FILM GREEN SHEET SLURRY, PRODUCTION METHOD OF THICK FILM GREEN SHEET AND PRODUCTION METHODS OF THICK FILM GREEN SHEET AND ELECTRONIC DEVICE

TECHNICAL FIELD

The present invention relates to a thick film green sheet slurry, a production method of thick film green sheet slurry, a production method of a thick film green sheet, a thick film green sheet and a production method of an electronic device: by which coating of a relatively thick film becomes possible, a sheet formed after coating has an excellent cutting property (strength capable of being cut), and it is possible to form a sheet having high air permeability, excellent handleability and a high adhesive force.

BACKGROUND ART

To produce a ceramic electronic device, such as a CR built-in type substrate and a multilayer ceramic capacitor, normally, ceramic slurry composed of a ceramic powder and a binder (an acrylic resin, butyral resin, etc.), a plasticizer and an organic solvent (toluene, MEK) is prepared first. Next, the ceramic slurry is applied on a PET film by using the doctor blade method, etc., heated to be dried and, then, the PET film is peeled, so that a ceramic green sheet is obtained. Next, an internal electrode is printed on the ceramic green sheet and dried, the results are stacked and cut into a chip shape to obtain green chips, and the green chips are fired and, then, terminal electrodes are formed thereon, so that an electronic device, such as a multilayer ceramic capacitor, is produced.

To produce a multilayer ceramic capacitor, an interlayer thickness of sheets, on which internal electrodes are formed, is in a range of about 1 μm to 100 μm based on desired capacitance required as a capacitor. Also, in a multilayer ceramic capacitor, a part not formed with an internal electrode is formed on outer parts in the stacking direction of the capacitor chip.

A thickness of the dielectric layer corresponding to the part not formed with an internal electrode is several tens of μm to several hundreds of μm or so, and this part is formed by using a relatively thick ceramic green sheet without an internal electrode printed thereon. A thickness of a green sheet having an internal electrode printed thereon is relatively thin, so that when forming the outer parts by using the thin film green sheet, the number of stacking layers becomes large and the number of production steps increases, which results in an increase of the production costs.

The larger the number of the dielectric layers in one-chip capacitor, the higher the capacity, however, since a size of the chip is limited, the dielectric layer has to be thinner. The dielectric layer is obtained by forming a sheet shape by covering dielectric particles having a particle diameter in a submicron order with a resin (a binder), stacking the results and firing. Production of a thin green sheet leads to a thin dielectric layer.

Also, since a thin sheet is fragile and easily broken, the present inventors have proposed to use a polyvinyl butyral (PVB) resin as a highly strong binder resin for a resin for forming the sheet. As a result, a dielectric green sheet having a thickness of 2 μm or thinner is produced and handling without damaging has become possible.

A ceramic portion used in the multilayer chip capacitor has a cap part (outer layer) for forming outside of the chip in addition to the dielectric layers (internal layers) sandwiched by the internal electrode layers for obtaining a capacity. The inner layers are required to be thin as explained above, while the outer layers are required to have a certain degree of thickness to protect the internal structure. Also, a sheet property required to the inner layers is precision, smoothness and strength, while, the outer layers are required to have a property attaching importance to handleability, such as adhesiveness, air permeability and cutting property.

As explained above, required sheet properties are largely different and almost opposite between the outer layers and the inner layers. Accordingly, a sheet satisfying the property required to the outer layers cannot be generally formed by coating green sheet slurry specializing in the inner layers.

Therefore, methods of changing a composition of the resin and adding additives to compensate characteristics that the resin lacks, etc. have been known. For example, in the patent article 1, the sheet property is controlled by blending resins. In the patent article 2 below, a tackifier is added to improve adhesiveness of the sheet.

However, in the method in the patent article 1, binder resins have different compositions respectively in the inner layer green sheet and outer layer green sheet. As a result, binder removal reaction arises at different timing between the inner layers and outer layers in the binder removal step of heating green chips, so that it is liable that strength of the chips declines to result in cracks and other damages.

Also, in the method in the patent article 2, adhesiveness of the sheet is considered to be improved by adding a tackifier, however, since the tackifier is a kind of resin components, the same disadvantage as that in the patent article 1 may be concerned.

Patent Article 1: the Japanese Unexamined Patent Publication No. 2002-104878

Patent Article 2: the Japanese Unexamined Patent Publication No. 2000-133547

DISCLOSURE OF THE INVENTION

Problems to be Solved by the Invention

The present invention was made in consideration of the above circumstances and has as an object thereof to provide thick film green sheet slurry, a production method of thick film green sheet slurry, a production method of a thick film green sheet, a thick film green sheet and a production method of an electronic device: by which coating of a relatively thick film becomes possible, a sheet formed after coating has excellent cutting property (strength capable of being cut), and it is possible to form a sheet having high air permeability, excellent handleability and a high adhesive force.

Means for Solving the Problems

To attain the above object, according to a first invention, there is provided a thick film-green sheet slurry comprising a ceramic powder, a binder resin including a butyral based resin as the main component, and a solvent, wherein:

the solvent includes a good solvent for letting the binder resin dissolved well therein and a poor solvent having lower solubility to the binder resin comparing with that of the good solvent; and the poor solvent is included in a range of 30 to 60 wt % with respect to the entire solvent.

In the present invention, the poor solvent is defined as a solvent which does not allow the binder resin to be dissolved therein at all, a solvent which almost does not allow the same to be dissolved but a little, or a solvent which does not allow the same to be dissolved but makes the same swell. On the other hand, the good solvent is solvents other than the poor solvent and allows the binder resin to be dissolved well.

Preferably, the poor solvent includes a solvent having a higher boiling point than that of the good solvent.

Preferably, the good solvent is alcohol, and the poor solvent includes at least one of toluene, xylene, mineral spirit, benzyl acetate, solvent naphtha, industrial gasoline, kerosene, cyclohexanone, heptanone and ethylbenzene. As alcohol as the good solvent, for example, methanol, ethanol, propanol and butanol, etc. may be mentioned.

Note that when mineral spirit (MSP) is included as the poor solvent, it is preferable that the mineral spirit alone is included in a range of larger than 7% but not larger than 15% with respect to the entire solution. When the MSP adding quantity is too large, air permeability tends to decline, while when the adding quantity is too large, it is liable that the sheet surface smoothness declines and a thick film is hard to be formed.

In the present invention, a thick film green sheet can be formed by using a fine powder colorant (ceramic powder) by using the same butyral based resin as the binder resin included in the thin layer dielectric slurry for realizing a thin layer dielectric layer without changing the resin or other solid organic components. Moreover, air permeability, cutting property and adhesiveness of a green sheet to be formed by using the thick film dielectric slurry of the present invention are improved and handleability of the thick film green sheet is improved. Accordingly, production of a thick film green sheet becomes easy, and production of an electronic device produced by using the thick film green sheet becomes easy.

Note that, in the present invention, since a thick film green sheet can be produced without changing the binder resin or other solid organic components included in the thin layer green sheet slurry, control in the binder removal step of heating the green chip becomes easy. Namely, binder removal reaction is brought at the same timing in a sheet of the thin layer green sheet slurry for forming inner layers and a sheet of the thick film green sheet slurry for forming outer layers. Therefore, strength of the chips does not decline and cracks and other damages are not caused thereby.

In the present invention, the poor solvent is included in a range of 30 to 60 wt %, more preferably 30 to 50 wt %, with respect to the entire solvent. When the weight % of the poor solvent is too small, the effects of the present invention tend to decline, while when too large, it is liable that the filtering characteristics decline and a thick film is hard to be formed.

Preferably, the butyral based resin is a polyvinyl butyral resin; and a polymerization degree of the polyvinyl butyral resin is 1000 or higher and 1700 or lower, a butyralation degree of the resin is higher than 64% and lower than 78%, and a residual acetyl amount is lower than 6%.

The polyvinyl butyral resin is the same resin as the binder resin included in the thin layer green sheet for realizing a thin dielectric layer, and it is liable that sufficient mechanical strength is hard to be obtained when made to be a thin layer. When the polymerization degree is too high, surface roughness tends to decline when made to be a sheet. Also, when the butyralation degree of the polyvinyl butyral resin is too low, solubility to slurry tends to decline, while when too high, sheet surface roughness tends to decline. Furthermore, when the residual acetyl amount is too large, the sheet surface roughness tends to decline.

Originally, it is difficult to form a thick film green sheet by using a polyvinyl butyral resin, which is suitable to forming a thin layer. However, in the present invention, by adjusting a composition of a solvent in the slurry, the same resin as the polyvinyl butyral resin suitable to forming a thin layer can be used as the binder resin to form a thick film green sheet.

Preferably, the binder resin is included in an amount of 4 to 6.5 parts by weight with respect to 100 parts by weight of the ceramic powder. When the adding quantity of the binder resin is too small, it is liable that sufficient adhesive strength is unable to be obtained for forming and processing the sheet, while when too much, the sheet strength tends to become too high.

A production method of the thick film green sheet slurry is to produce the thick film green sheet slurry explained in any one of the above, wherein a ceramic powder is pulverized, so that an average particle diameter of the ceramic powder after being dispersed in the thick film green sheet slurry does not become smaller than 80% or less with respect to an average particle diameter of the ceramic powder before being dispersed in the thick film green sheet slurry.

In the thin layer green sheet slurry, to realize a thin layer sheet, the ceramic powder is pulverized, so that an average particle diameter of the ceramic powder after being dispersed in the green sheet slurry becomes as fine as 80% or smaller with respect to an average particle diameter of the base material. On the other hand, in the thick film green sheet slurry, when an average particle diameter of the ceramic powder with respect to that of the base material becomes too small, the sheet density becomes high, adhesiveness deteriorates, handleability declines, and a thick film is hard to be formed. Accordingly, the ceramic powder had to be dispersed in the slurry without pulverizing the ceramic powder finer in a conventional method. For example, the ceramic powder had to be dispersed in the slurry by strictly managing the pulverizing level to 100% to 90%, however, the control was difficult. In the present embodiment, as a result that a poor solvent is included as the solvent, pulverization up to 80% becomes permissive, and the step of dispersing the ceramic powder in the slurry becomes easier. Also, in the present invention, time of the slurry producing step (colorant dispersing and resin kneading) can be made short.

A production method of a thick film green sheet according to the present invention comprises the steps of:

preparing the thick film green sheet slurry explained in any one of the above; and forming a thick film green sheet by using the thick film green sheet slurry.

The thick film green sheet of the present invention is produced by the thick film green sheet slurry explained in any one of the above.

the thick film green sheet according to the present invention is suitable to be used, for example, for an outer layer parts (parts not sandwiched by the internal electrode layers and not contributing to the dielectric characteristics) of a ceramic chip capacitor.

A production method of a ceramic electronic device of the present invention comprises the steps of:

preparing the thick film green sheet slurry explained in any one of the above;

forming an outer green sheet by using the thick film green sheet slurry;

preparing thin film green sheet slurry including a same kind of binder resin as a binder resin included in the thick film green sheet slurry;

forming a thinner inner green sheet than the outer green sheet by using the thin film green sheet slurry;

obtaining a multilayer body by stacking the inner green sheets via internal electrode layers;

obtaining a green chip by stacking the outer green sheet on both end surfaces in the stacking direction of the multilayer body; and firing the green chip.

Preferably, the thin layer green sheet slurry includes a same kind of ceramic powder as a ceramic powder included in the thick film green sheet slurry. By using the same kind of ceramic powder, production of a ceramic electronic device becomes easy.

Preferably, an average particle diameter of the ceramic powder included in the thin film green sheet slurry is smaller than an average particle diameter of the ceramic powder included in the thick film green sheet slurry. Due to the relationship, realization of a thin inner green sheet and realization of a thick outer green sheet can be satisfied at a time.

Preferably, there are steps of pulverizing a ceramic powder, so that an average particle diameter of the ceramic powder after being dispersed in the thick film green sheet slurry does not become smaller than 80% with respect to an average particle diameter of the ceramic powder before being dispersed in the thick film green sheet slurry; and pulverizing a ceramic powder, so that an average particle diameter of the ceramic powder after being dispersed in the thin film green sheet slurry becomes 80% or smaller with respect to an average particle diameter of the ceramic powder before being dispersed in the thin film green sheet slurry.

As a result, realization of a thin inner green sheet and realization of a thick outer green sheet can be satisfied at a time. Also, strict management of a condition of pulverization in the step of dispersing the ceramic powder in the thick film green sheet slurry can be eased.

BEST MODE FOR CARRYING OUT THE INVENTION

Figure 1:
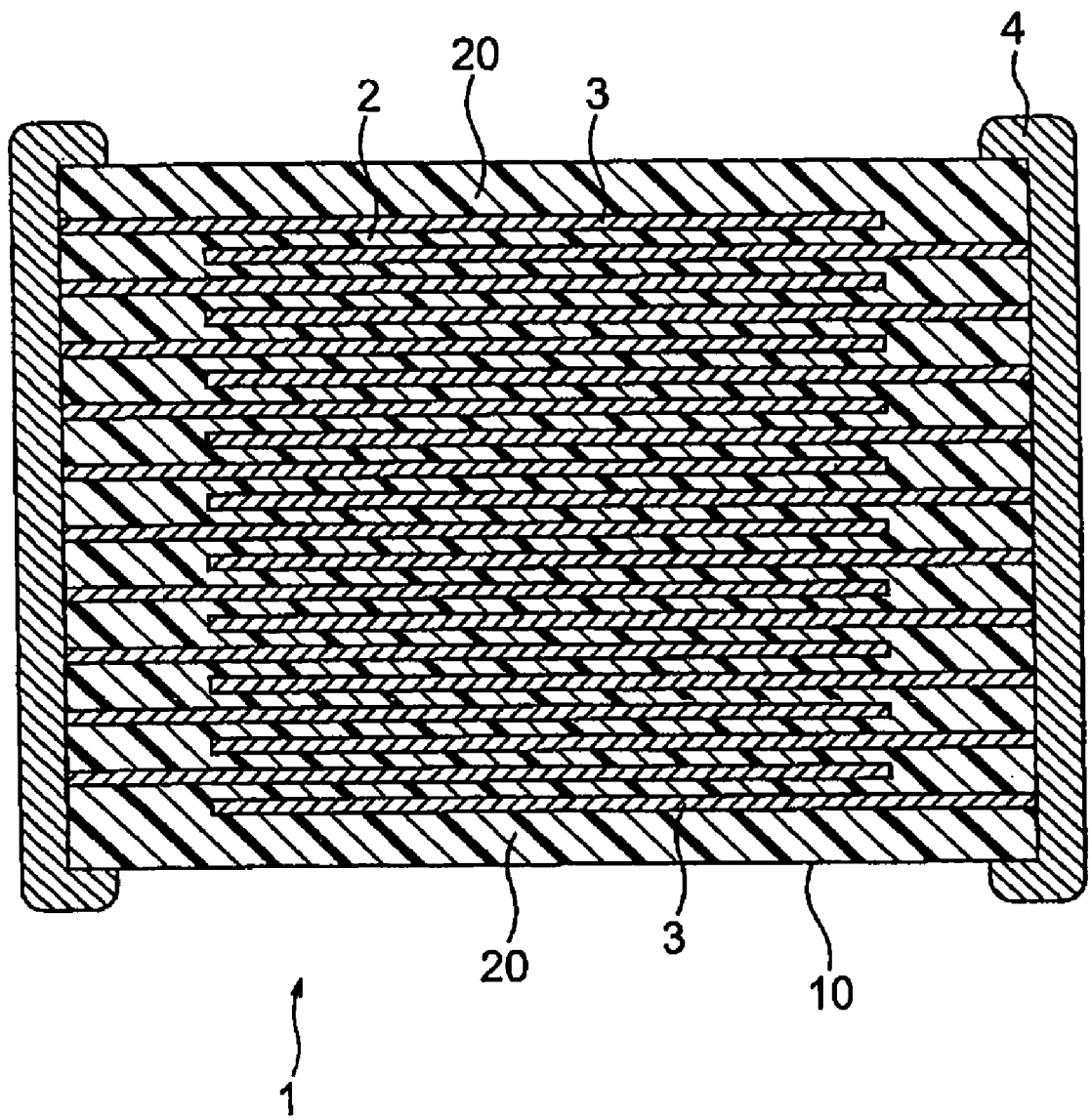
FIG. 1 is a schematic sectional view of a multilayer ceramic capacitor according to an embodiment of the present invention.

Below, the present invention will be explained based on an embodiment shown in the drawings.

First, as an embodiment of an electronic device produced by using the green sheet slurry (dielectric paste) and green sheets according to the present invention, an overall configuration of a multilayer ceramic capacitor will be explained.

As shown in FIG. 1, the multilayer ceramic capacitor 1 has a capacitor element body 10 having the configuration that internal dielectric layers 2 and internal electrode layers 3 are alternately stacked. On both end sides of the capacitor element body 10, a pair of terminal electrodes 4 respectively conducting to the alternately arranged internal electrode layers 3 inside the element body 10 are formed. A shape of the capacitor element body 10 is not particularly limited, but is normally a rectangular parallelepiped shape. Also, the size is not particularly limited and may be a suitable size in accordance with the use purpose, but is normally a length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

The internal electrode layers 3 are stacked, so that end surfaces of both sides are exposed alternately to surfaces of two facing end portions of the capacitor element body 10. The pair of terminal electrodes 4 are formed at both end portions of the capacitor element body 10 and connected to the exposed end surfaces of the alternately arranged internal electrode layers 3 so as to configure a capacitor circuit.

In the capacitor element body 10, both outer end portions in the stacking direction of the internal electrode layers 3 and the inner dielectric layers 2 are arranged with outer dielectric layers 20 to protect inside of the element body 10.

Dielectric Layers 2 and 20

A composition of the inner dielectric layers 2 and outer dielectric layers 20 is not particularly limited in the present invention but is, for example, composed of dielectric ceramic composition below.

A dielectric ceramic composition of the present embodiment is composed, for example, of a dielectric material, such as calcium titanate, strontium titanate and/or barium titanate.

Note that the number of stacked layers, thickness and other condition of the inner dielectric layers 2 shown in FIG. 1 may be suitably determined in accordance with the use object, but in the present embodiment, a thickness of the inner dielectric layer 2 is made as thin as 1 μm to 50 μm or so, preferably 5 μm or thinner, and more preferably 3 μm or thinner. Also, a thickness of the outer dielectric layer 20 is, for example, 100 μm to several hundreds of μm or so.

Internal Electrode Layer 3

A conductive material included in the internal electrode layer 3 is not particularly limited, but since components of the inner dielectric layer 2 has reduction-resistance, base metals may be used. As base metals to be used as the conductive material, Ni, Cu, a Ni alloy or Cu alloy is preferable. When a main component of the inner electrode layer 3 is Ni, a method of firing in a low oxygen partial pressure (reducing atmospheres is used, so that the dielectric is not reduced. On the other hand, a method of making a composition ratio of the dielectric deviated from the stoichiometric composition, etc. is used so as not to be reduced.

A thickness of the internal electrode layer 3 may be suitably determined in accordance with the use object, etc., but normally it is 0.5 to 5 μm or so.

Terminal Electrode 4

A conductive material to be included in the terminal electrodes 4 is not particularly limited and normally Cu, a Cu alloy, Ni or a Ni alloy, etc. is used. Note that Ag and an Ag—Pd alloy, etc. may be also used. Note that, in the present embodiment, inexpensive Ni, Cu and alloys of them may be used.

A thickness of the terminal electrodes may be suitably determined in accordance with the use object, etc. but normally 10 to 50 μm or so is preferable.

Production Method of Multilayer Ceramic Capacitor

Next, a production method of a multilayer ceramic capacitor according to an embodiment of the present invention will be explained.

(1) First, thin layer dielectric slurry (thin layer green sheet slurry) is prepared for producing a ceramic green sheet to compose the internal dielectric layers 2 shown in FIG. 1 after firing.

The thin film dielectric slurry is composed of organic solvent based slurry obtained by kneading a dielectric material (ceramic powder) and an organic vehicle.

The dielectric material may be suitably selected from a variety of compounds to be composite oxides or oxides, for example, carbonate, nitrate, hydroxide and organic metal compound, etc., and mixed for use. Normally, they are used as a powder having an average particle diameter of 0.1 to 3 μm or smaller, and preferably about 0.4 μm or smaller. Note that, to form an extremely thin green sheet, it is preferable to use a finer powder than a thickness of the green sheet.

An organic vehicle is obtained by dissolving a binder resin in an organic solvent. The binder resin to be used for the organic vehicle in the present embodiment is a polyvinyl butyral resin. A polymerization degree of the polyvinyl butyral resin is 1000 or higher and 1700 or lower, and preferably, 1400 to 1700. Also, a butyralation degree of the resin is higher than 64% and lower than 78%, preferably, higher than 64% and 70% or lower. The residual acetyl amount is smaller than 6%- and preferably 3% or smaller.

A polymerization degree of the polyvinyl butyral resin can be measured, for example, from a polymerization degree of a polyvinyl acetal resin as the material. Also, a butyralation degree can be measured, for example, based on JISK6728. Furthermore, the residual acetyl amount can be measured based on JISK6728.

When the polymerization degree of the polyvinyl butyral resin is too low, for example, in the case of making the layer as thin as 5 μm or thinner and preferably 3 μm or thinner, it is liable that sufficient mechanical strength is hard to be obtained. While, when the polymerization degree is too high, surface roughness tends to decline when made to be a sheet. Also, when the butyralation degree of the polyvinyl butyral resin is too low, solubility to slurry tends to decline, while when too high, sheet surface roughness tends to decline. Furthermore, when the residual acetyl amount is too large, the sheet surface roughness tends to decline.

The organic solvent to be used for the organic vehicle is not particularly limited and, for example, terpineol, alcohol, butyl carbitol, acetone, toluene and other organic solvents may be used. In the present embodiment, the organic solvent preferably includes an alcoholic solvent and an aromatic solvent, and the aromatic solvent is included in an amount of 10 parts by weight or larger but not larger than 20 parts by weight when assuming that total weight of the alcoholic solvent and aromatic solvent is 100 parts by weight. When a content of the aromatic solvent is too small, sheet surface roughness tends to increase, while when too large, filtering characteristics of the slurry decline and the sheet surface roughness also increases to be deteriorated.

As the alcoholic solvent, methanol, ethanol, poropanol and butanol, etc. may be mentioned. As the aromatic solvent, toluene, xylene and benzyl acetate, etc. may be mentioned.

Preferably, the binder resin is dissolved in at least one kind of alcoholic solvent of methanol, ethanol, propanol and butanol and filtered to be a solution in advance and added to a dielectric powder and other components. A binder resin having a high polymerization degree is hard to be dissolved in a solvent and dispersibility of slurry tends to decline in a normal method. In the method of the present embodiment, a binder resin having a high polymerization degree is dissolved in a good solvent as above before adding a ceramic powder and other components to the solution, so that slurry dispersibility can be improved and an undissolved resin can be suppressed. Note that it is liable that solid content concentration cannot become high and changes of lacquer viscosity over time increases when using other solvents than the above.

In the present embodiment, a xylene based resin may be added as a tackifier together with the binder resin to the dielectric slurry. The xylene based resin is added in a range of 1.0 wt % or smaller, more preferably 0.1 or larger but not larger than 1.0 wt %, and particularly preferably larger than 0.1 but not larger than 1.0 wt % with respect to 100 parts by weight of a ceramic powder. When the adding quantity of the xylene is too small, adhesiveness tends to decline. While, when the adding quantity is too large, the adhesiveness improves but it is liable that the sheet surface roughness increases, stacking a large number of layers becomes difficult, tensile strength of the sheet declines, and handleability of the sheet declines.

The green sheet slurry may include additives selected from a variety of dispersants, plasticizers, antistatic agents, dielectrics, glass flits and insulators in accordance with need.

In the present embodiment, dispersants are not particularly limited, but polyethylene glycol based nonionic dispersants are preferably used, and a value of the hydrophilic property/lipophilic property balance (HLB) is 5 to 6. Dispersants are added in an amount of 0.5 part by weight or larger and 1.5 parts by weight or smaller, and more preferably 0.5 parts by weight or larger and 1.0 parts by weight or smaller with respect to 100 parts by weight of ceramic powder.

When the HLB is out of the above ranges, it is liable that the slurry viscosity increases and the sheet surface roughness increases. Also, other dispersants than polyethylene glycol based nonionic dispersants are not preferable because the slurry viscosity increases, the sheet surface roughness increases, and a sheet elongation rate declines.

When the adding quantity of the dispersant is too small, the sheet surface roughness tends to increase, while when too large, the sheet tensile-strength and stackability tend to decline.

In the present embodiment, as a plasticizer, dioctyl phthalate is preferably used and is included in an amount of preferably 40 parts by weight or larger and 70 parts by weight or smaller, more preferably 40 to 60 parts by weight with respect to 100 parts by weight of the binder resin. Comparing with other plasticizers, dioctyl phthalate is preferable in both of the sheet strength and sheet elongation, and is particularly preferable because the release strength from the supporting body is small for being easily removed. Note that when the content of the plasticizer is too small, it is liable that the sheet elongation becomes small and flexibility declines. While when the content is too large, it is liable that the plasticizer breeds out from the sheet, segregation of the plasticizer to the sheet easily arises, and dispersibility of the sheet declines.

Also, in the present embodiment, the dielectric slurry contains water in an amount of 1 part by weight or more and 6 parts by weight or less, preferably 1 to 3 parts by weight with respect to 100 parts by weight of dielectric powder. When the content of water is too small, it is liable that changes of slurry characteristics due to moisture absorbent over time become large, slurry viscosity increases, and filtering characteristics of the slurry declines. While when the water content is too large, it is liable that separation and precipitation of the slurry arise, dispersibility declines, and sheet surface roughness declines.

Furthermore, in the present embodiment, at least one of a hydrocarbon based solvent, industrial gasoline, kerosene and solvent naphtha is added in an amount of preferably 3 parts by weight or larger and 15 parts by weight or smaller, and more preferably 5 to 10 parts by weight with respect to 100 parts by weight of the dielectric powder. By adding these additives, sheet strength and sheet surface roughness can be improved. When the adding quantity of the additives is too small, effects of adding is small, while when too large, it is liable that the sheet strength and sheet surface roughness inversely decline.

The binder resin is contained in an amount of preferably 5 parts by weight or larger and 6.5 parts by weight or smaller with respect to 100 parts by weight of the dielectric powder. When the content of the binder resin is too small, it is liable that the sheet strength declines and stackability (adhesiveness at stacking) declines. While, when the content of the binder resin is too large, it is liable that segregation of the binder resin arises to deteriorate the dispersibility and the sheet surface roughness declines.

Also, when assuming that a total volume of the ceramic powder, binder resin and plasticizer is 100 volume %, the volume ratio of the dielectric powder is preferably 62.42% or higher and 72.69% or lower, and more preferably 63.93% or higher and 72.69% or lower. When the volume ratio is too small, it is liable that segregation of the binder easily arises, dispersibility declines, and surface roughness declines. While, when the volume ratio is too large, it is liable that the sheet strength declines and stackability deteriorates.

Furthermore, in the present embodiment, the dielectric slurry preferably includes an antistatic agent, and the antistatic agent is preferably an imidazoline based antistatic agent. When the antistatic agent is not an imidazoline based antistatic agent, an antistatic effect is small and sheet strength, sheet elongation degree or adhesiveness tends to decline.

The antistatic agent is included in an amount of 0.1 part by weight or larger and 0.75 part by weight or smaller, and more preferably 0.25 to 0.5 part by weight. When an adding quantity of the antistatic agent is too small, the antistatic effect becomes small, while when too large, it is liable that the sheet surface roughness declines and the sheet strength declines. When the antistatic effect is too small, static electricity easily arises at the time of removing a carrier sheet as a support body from the ceramic green sheet and disadvantages easily arise, such that wrinkles arise on the green sheet.

To fabricate the dielectric slurry, first, a ceramic powder is dispersed in the slurry by a ball-mill, etc. (colorant dispersion step). The colorant dispersion step is also a pulverizing step of the ceramic powder (colorant) at the same time, and the progress can be also acquired from changes of an average particle diameter of the ceramic powder. In the present embodiment, in the colorant dispersion step, the colorant is pulverized and dispersed so that an average particle diameter of the ceramic powder after being dispersed in the slurry becomes 80% or smaller, preferably smaller than 80%, with respect to an average particle diameter of the ceramic powder (base material) before being dispersed in the slurry.

Next, a dispersant and other additives are added and dispersed in the slurry including the ceramic powder to obtain dispersion slurry (a dispersant adding and dispersing step). Finally, the dispersion slurry is added with a binder resin and kneaded (a resin kneading step).

Figure 2:
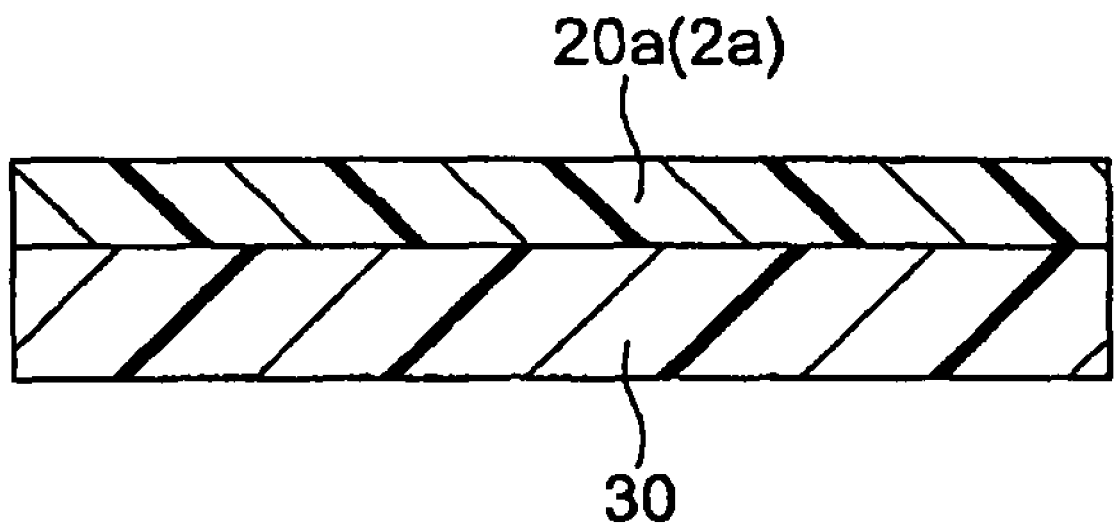
FIG. 2 is a sectional view of a key part of a green sheet used in production steps of the capacitor shown in FIG. 1.

The thus obtained dielectric slurry (thin film green sheet slurry) is used to form an inner green sheet 2a to have a thickness of 0.5 to 30 µm, more preferably 0.5 to 10 µm or so, on a carrier sheet 30 as a support body as show in FIG. 2 by the doctor blade method, etc. The inner green sheet 2a is dried after being formed on the carrier sheet 30.

A drying temperature of the inner green sheets is preferably 50 to 100° C., and the drying time is preferably 1 to 20 minutes. A thickness of the inner green sheet after drying is contracted to 5 to 25% comparing with that before drying. The thickness of the inner green sheet 2a after drying is preferably 3 µm or thinner.

(2) Next, thick film dielectric slurry (thick film green sheet slurry) is prepared to produce a ceramic green sheet for composing the outer dielectric layers 20 shown in FIG. 1 after firing.

The thick film dielectric slurry is fabricated in the same way as in the thin film dielectric slurry explained above other than the explanation below.

The thick film dielectric slurry is composed of organic solvent based slurry obtained by kneading a dielectric material (ceramic powder) with an organic vehicle in the same way as in the thin layer dielectric slurry. A binder resin to be used in the thick film dielectric slurry is the same as that used in the thin layer dielectric slurry.

An organic solvent to be used for the organic solvent of the thick film dielectric slurry preferably includes a good solvent for the binder resin to be dissolved well and a poor solvent giving poorer solubility to the binder resin comparing with the good solvent. The poor solvent is included in a range of 30 to 60 wt % with respect to the entire solvent. Moreover, the poor solvent includes a solvent having a higher boiling point than that of the good solvent.

The good solvent is, for example, alcohol, and the poor solvent includes at least one of toluene, xylene, mineral spirit, benzyl acetate, solvent naphtha, industrial gasoline, kerosene, heptanone and ethyl benzene. As alcohol as the good solvent, for example, methanol, ethanol, propanol and butanol, etc. may be mentioned.

Note that when mineral spirit (MSP) is included as the poor solvent, it is preferable that the mineral spirit alone is included in a range of larger than 7% but not larger than 15% with respect to the entire solvent. When the MSP adding quantity is too small, air permeability tends to decline, while when the adding quantity is too large, it is liable that the sheet surface smoothness declines and films are hard to be formed thick.

The poor solvent is included in a range of preferably 30 to 60 wt %, more preferably 30 to 50 wt %. When the weight % of the poor solvent is too small, the effects of the present invention tend to decline, while when too large, it is liable that the filtering characteristics decline and suitable slurry in terms of molding a sheet cannot be obtained.

Preferably, the binder resin is included in an amount of 4 to 6.5 parts by weight with respect to 100 parts by weight of the ceramic powder. When the adding quantity of the binder resin is too small, it is liable that sufficient strength and adhesiveness cannot be obtained in terms of molding and processing the sheet, while when too large, the sheet strength tends to become too high.

To fabricate the thick film dielectric slurry, a ceramic powder is dispersed in slurry by a ball-mill, etc. first (a colorant dispersion step). The colorant dispersion step is also a pulverizing step of the ceramic powder (colorant) at the same time, and the progress can be also acquired from changes of an average particle diameter of the ceramic powder. In the present embodiment, in the colorant dispersion step, the colorant is pulverized and dispersed so that an average particle diameter of the ceramic powder after being dispersed in the slurry does not become smaller than 80% with respect to an average particle diameter of the ceramic powder (base material) before being dispersed in the slurry.

In the thin layer dielectric slurry, the ceramic powder is pulverized, so that an average particle diameter of the ceramic powder after being dispersed in the slurry becomes as fine as 80% or smaller with respect to an average particle diameter of the base material to realize a thin sheet. On the other hand, in the thick film dielectric slurry, when the average particle diameter of the ceramic powder with respect to that of the base material becomes too small, the sheet density becomes high, adhesiveness declines, the handleability declines and a thick film is hard to be obtained. Accordingly, the ceramic powder had to be dispersed in the slurry without pulverizing the ceramic powder finer in a conventional method. For example, the ceramic powder had to be dispersed in the slurry by strictly managing the pulverizing level to 100% to 90%, however, the control was difficult. In the present embodiment, as a result that a poor solvent is included as the solvent, pulverization up to 80% becomes permissive, and the step of dispersing the ceramic in the slurry becomes easier.

Next, a dispersant and other additives are added and dispersed in the slurry including the ceramic powder so as to obtain dispersion slurry (a dispersion adding and dispersing step). Finally, the dispersion slurry is added with a binder resin and kneaded (a resin kneading step).

The thus obtained thick film dielectric slurry (thick film green sheet slurry) is used to form an outer green sheet 20a to have a thickness of preferably 10 to 100 μm, more preferably 10 to 30 μm or so, on a carrier sheet 30 as a support body as show in FIG. 2 by the doctor blade method, etc. The outer green sheet 20a is dried after being formed on the carrier sheet 30. The carrier sheet 30 is formed, for example, by a PET film, etc.

A drying temperature of the outer green sheets is preferably 50 to 100° C., and the drying time is preferably 1 to 20 minutes. A thickness of the outer green sheet after drying is contracted to 5 to 25% comparing with that before drying. The thickness of the outer green sheet 20a after drying is preferably 10 μm or thicker. The outer green sheet 20a obtained by peeling the carrier sheet 30 is a part composing the outer dielectric layers 20 shown in FIG. 1.

(3) Next, on one surface of the inner green sheet 2a, an internal electrode layer 3 shown in FIG. 1 is formed. A method of forming the internal electrode layer 3 is not particularly limited and a printing method, thin film method and transfer method, etc. may be mentioned.

Figure 3:
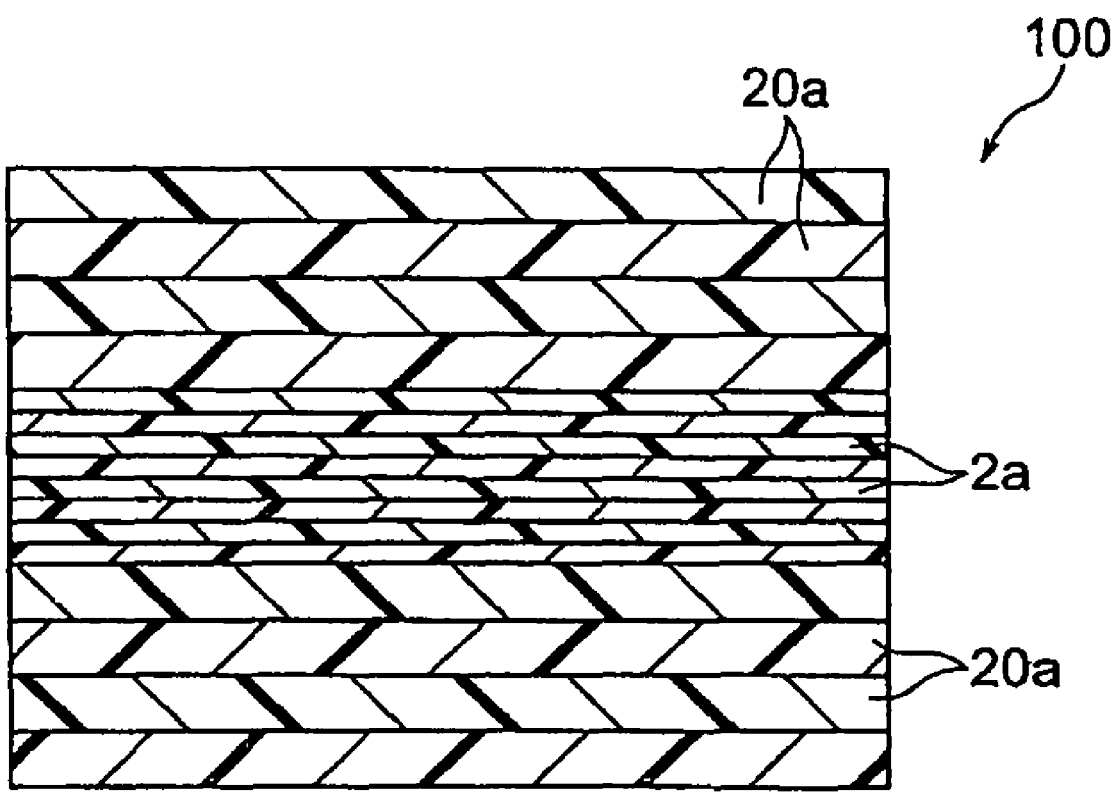
FIG. 3 is a sectional view of a key part of a green chip used in the production steps of the capacitor shown in FIG. 1.

After that, as shown in FIG. 3, inner green sheets 2a formed with an internal electrode layer are alternately stacked, and the outer green sheets 20a are stacked by one or more layers on both of the outer end portions in the stacking direction.

Next, the thus obtained stacked body is cut into a predetermined multilayer body size to obtain a green chip 100 and, then, binder removal processing and firing are performed thereon. Then, thermal treatment is performed to re-oxidize the dielectric layers 2 and 20.

The binder removal processing may be performed under a normal condition, but when Ni, a Ni alloy or other base metal is used as a conductive material of the internal electrode layers, the condition below is particularly preferable.

Temperature raising rate: 5 to 300° C./hour, particularly 10 to 50° C./hour
Holding temperature: 200 to 400° C., particularly 250 to 350° C.
Holding time: 0.5 to 20 hours, particularly 1 to 10 hours.
Atmosphere: wet mixed gas of $N_2$ and $H_2$
A firing condition is preferably as below.
Temperature raising rate: 50 to 500° C./hour, particularly 200 to 300° C./hour
Holding temperature: 1100 to 1300° C., particularly 1150 to 1250° C.
Holding time: 0.5 to 8 hours, particularly 1 to 3 hours
Cooling rate: 50 to 500° C./hour, particularly 200 to 300° C./hour
Atmosphere: wet mixed gas of $N_2$ and $H_2$, etc.
Note that an oxygen partial pressure in the air at firing is preferably $10^{-2}$ Pa, particularly $10^{-2}$ to $10^{-8}$ Pa. When exceeding the above range, the internal electrode layers tend to be oxidized, while when the oxygen partial pressure is too low, it is liable that an electrode material of the internal electrode layers results in abnormal sintering to be broken.

The thermal treatment after the firing as above is preferably performed with a holding temperature or the highest temperature of 1000° C. or higher, more preferably 1000 to 1100° C. When the holding temperature or the highest temperature at the thermal treatment is lower than the range, oxidization of the dielectric material is insufficient and the insulation resistance lifetime tends to be short. While when exceeding the above range, not only Ni of the internal electrodes is oxidized to deteriorate the capacity, but it reacts with the dielectric base material, and the lifetime tends to be short as well. The oxygen partial pressure at the thermal treatment is higher than a reducing atmosphere at firing and preferably $10^{-3}$ Pa to 1 Pa, more preferably $10^{-2}$ Pa to 1 Pa. When below the above ranges, re-oxidization of the dielectric layers 2 becomes difficult, while when exceeding the above ranges, the internal electrode layers 3 tend to be oxidized. Other condition at the thermal treatment is preferably as below.

Holding time: 0 to 6 hours, particularly 2 to 5 hours
Cooling rate: 50 to 500° C./hour, particularly 100 to 300° C./hour
Atmosphere: wet $N_2$ gas, etc.

Note that, for example, a wetter, etc. may be used to wet the $N_2$ gas and mixed gas, etc. In this case, the water temperature is preferably 5 to 75° C. or so. The binder removal processing, firing and thermal treatment may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment. On the other hand, when performing them separately, at the time of firing, after raising the temperature to the holding temperature of the binder removal processing in an atmosphere of a $N_2$ gas or a wet $N_2$ gas, the atmosphere is changed, and the temperature is preferably furthermore raised. After that, after cooling the temperature to the holding temperature of the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

End surface polishing, for example, by barrel polishing or sand blast, etc. is performed on the sintered body (element body 10) obtained as above, and terminal electrode slurry is burnt to form terminal electrodes 6 and 8. A firing condition of the terminal electrode slurry is preferably, for example, at 600 to 800° C. in a wet mixed gas of $N_2$ and $H_2$ for 10 minutes to 1 hour or so. A pad layer is formed by plating, etc. on the surface of the terminal electrodes 6 and 8 if necessary. Note that the terminal electrode slurry may be fabricated in the same way as in the case of the electrode slurry explained above.

A multilayer ceramic capacitor of the present invention produced as above is mounted on a print substrate, etc. by soldering, etc. and used for a variety of electronic apparatuses, etc.

In the production method of a multilayer ceramic capacitor using the dielectric slurry (thin layer green sheet slurry) and the green sheet according to the present embodiment, as a result of using a binder resin including a butyral based resin as the main component, it becomes possible to produce a thin layer green sheet having enough strength for being peeled from a support body and good adhesiveness and handleability even in the case of an extremely thin green sheet. For example, a thickness of a dielectric layer after firing (a green sheet after firing) may be made as thin as 5 μm or thinner, preferably 3 μm or thinner, and furthermore preferably 2 μm or thinner. Also, since the thin layer green sheet of the present embodiment has small surface roughness, the number of layers to be stacked may be also increased.

Also, in the production method of a multilayer ceramic capacitor using the thin layer dielectric slurry (thin layer green sheet slurry) and the green sheet according to the present embodiment, a specific kind of dispersant having HLB in a specific range is used. Therefore, even an extremely thin green sheet of about 5 μm or thinner has enough strength to be peeled from a carrier sheet and good adhesiveness and handleability. Also, the sheet surface roughness is small and stackability is excellent. Therefore, a large number of green sheets can be easily stacked via electrode layers.

Furthermore, in the production method of a multilayer ceramic capacitor using the thick film dielectric slurry (thick film green sheet slurry) and the green sheet according to the present embodiment, a thick film green sheet can be formed by using a fine powder colorant (ceramic powder) by using the same butyral based resin as the binder resin included in the thin layer dielectric slurry for realizing a thin layer dielectric layer without changing the resin or other solid organic components. Moreover, air permeability, cutting property and adhesiveness of a green sheet to be formed by using the thick film dielectric slurry of the present embodiment are improved and handleability of the thick film green sheet is improved. Accordingly, production of a thick film green sheet becomes easy, and production of an electronic device produced by using the thick film green sheet becomes easy.

Note that, in the present embodiment, since a thick film green sheet can be produced without changing the binder resin or other solid organic components included in the thin layer dielectric slurry, control in the binder removal step of heating the green chip becomes easy. Namely, binder removal reaction is brought at the same timing in a sheet of the thin layer dielectric slurry for forming inner layers and a sheet of the thick film dielectric slurry for forming outer layers. Therefore, strength of the chips does not decline and cracks and other damages are not caused thereby.

Note that the present invention is not limited to the above embodiment and may be variously modified within the scope of the present invention.

For example, the method of the present invention is not limited to a production method of a multilayer ceramic capacitor and may be applied as a production method of other multilayer type electronic devices.

EXAMPLES

Below, the present invention will be explained based on furthermore detailed examples, but the present invention is not limited to the examples.

Example 1a

Production of Thick Film Green Sheet Slurry

As a starting material of the ceramic powder, $BaTiO_3$ powder (BT-02 of Sakai Chemical Industry Co., Ltd.) was used. Ceramic powder subcomponent additives were prepared to attain $(Ba_{0.6}Ca_{0.4})SiO_3$: 1.48 parts by weight, $Y_2O_3$: 1.01 parts by weight, $MgCO_3$: 0.72 wt %, $Cr_2O_3$: 0.13 wt % and $V_2O_5$: 0.045 wt % with respect to 100 parts by weight of the $BaTiO_3$ powder.

First, only the subcomponent additives were mixed by a ball-mill to obtain slurry. Namely, the subcomponent additives (total amount is 8.8 g), ethanol in an amount of 6 g, n-propanol in an amount of 6 g, xylene in an amount of 2 g and a dispersant (0.1 g) were preliminarily pulverized by a ball-mill for 20 hours.

As a binder, 15% lacquer (BH6 made by Sekisui Chemical Co., Ltd. was dissolved in ethanol/n-propanol=1:1) of BH6 (polyvinyl butyral resin/PVB) was used. Also, as a dispersant, a polyethylene glycol based nonionic dispersant (HLB=5 to 6) was used.

Next, $BaTiO_3$ in an amount of 191.2 g was added with the preliminarily pulverized slurry of subcomponent additives, ethanol in an amount of 37 g, n-propanol in an amount of 37 g, xylene in an amount of 50 g, mineral spirit (MSP) in an amount of 15 g, DOP (dioctyl phthalate) as a plasticizer component in an amount of 6 g, a polyethylene glycol based nonionic dispersant (HLB=5 to 6) in an amount of 1.4 g and solid content of 15% lacquer (BH6 made by Sekisui Chemical Co., Ltd. was dissolved in ethanol/n-propanol=1:1) of BH6 (polyvinyl butyral resin/PvB) in an amount of 6 wt % (Bog as an adding quantity of lacquer). After that, this dispersion slurry was mixed by a ball-mill for 20 hours, so that ceramic slurry. (thick film green sheet slurry) was obtained.

When producing the ceramic slurry, colorant was pulverized and dispersed, so that an average particle diameter d50 of the ceramic powder after being dispersed in the slurry becomes 82.2%, which is larger than 80%, with respect to an average particle diameter of the ceramic powder (base material) before being dispersed in the slurry as shown in Table 1 below. Namely, an average particle diameter d50 of $BaTiO_3$ as a base material before being dispersed in the slurry was 0.623 μm, while, as a result of mixing by a ball-mill, the average particle diameter d50 of $BaTiO_3$ became 0.512 μm, which satisfied the pulverization condition of 82.2%. Note that the D50 diameter means an average particle diameter at 50% of entire volume of the ceramic powder and is defined, for example, by JISR1629, etc. The particle diameter was measured by the Microtruc HRA made by Nikkiso Co., Ltd.

A polymerization degree of the polyvinyl butyral resin as a binder resin included in the ceramic slurry was 1400, a butyralation degree thereof was 69±3%, and a residual acetyl amount was 3±2%. This binder resin was included in an amount of 6 parts by weight with respect to 100 parts by weight of the ceramic powder (including ceramic powder subcomponent additives).

Also, DOP as a plasticizer was included in an amount of 50 parts by weight with respect to 100 parts by weight of the binder resin. A polyethylene glycol based nonionic dispersant as a dispersant was included in an amount of 0.7 part by weight with respect to 100 parts by ceramic powder (base material) before being dispersed in the slurry as shown in Table 1 below. Namely, an average particle diameter d50 of $BaTiO_3$ as a base material before being dispersed in the slurry was 0.623 μm, while, as a result of mixing by a ball-mill, the average particle diameter d50 of $BaTiO_3$ became 0.512 μm, which satisfied the pulverization condition of 82.2%. Note that the D50 diameter means an average particle diameter at 50% of entire volume of the ceramic powder and is defined, for example, by JISR1629, etc. The particle diameter was measured by the Microtruc HRA made by Nikkiso Co., Ltd.

A polymerization degree of the polyvinyl butyral resin as a binder resin included in the ceramic slurry was 1400, a butyralation degree thereof was 69±3%, and a residual acetyl amount was 3±2%. This binder resin was included in an amount of 6 parts by weight with respect to 100 parts by weight of the ceramic powder (including ceramic powder subcomponent additives).

Also, DOP as a plasticizer was included in an amount of 50 parts by weight with respect to 100 parts by weight of the binder resin. A polyethylene glycol based nonionic dispersant as a dispersant was included in an amount of 0.7 part by weight with respect to 100 parts by weight of the ceramic powder.

Also, as shown in Table 1, in the slurry, ethanol and n-propanol as the good solvent were included in an amount of 68.2 wt %, MSP as a part of the poor solvent was included in an amount of 9.1 wt %, and xylene as a part of the poor solvent and as a solvent having a high boiling point was included in an amount of 22.7 wt % with respect to the entire solvent. Namely, the poor solvent composed of MSP and xylene was included in an amount of 31.8 wt % with respect to the entire solvent.

Results of testing filtering characteristics of the ceramic slurry are shown in Table 1. In an evaluation of the filtering characteristics, a product No. 5C with a retention particle diameter of 4 μm made by Kiriyama glass Co. was used as a paper filter and time taken by 150 g of the slurry to pass a paper filter area of 28.26 cm$^2$ under a pressure of 0.1 MPa was measured and evaluated. The shorter the filtering time, the more excellent the filtering characteristics are. Being excellent in filtering characteristics means that a flocculated substance is few in the slurry and the binder resin is well dissolved. Those exhibited the filtering time of 5 minutes or shorter were considered good (o) in the comprehensive evaluation. Also, those required more than 5 minutes filtering time were evaluated "x" in Table 1.

TABLE 1

| | Solvent Data | | | | Colorant Property | | | Slurry Property | | |
|---|---|---|---|---|---|---|---|---|---|---|
| | Poor Solvent Amount [wt %] | MSP Adding Quantity [wt %] | Poor Solvent Other Than MSP | Xylene and Toluene Amount [wt %] | Bass Material d50 [μm] | Slurry Colorant d50 [μm] | Slurry/ Base Material [%] | Filtering Characteristics [o or x] | Coating Thickness [μm] | Evaluation of Coating Thickness [o or x] |
| Comparative Example 1a | 20.3 | 8.3 | Xylene | 14.1 | 0.608 | 0.486 | 79.8 | o | 8 | x |
| Comparative Example 1b | 27.3 | 9.1 | Xylene | 18.2 | 0.623 | 0.51 | 81.9 | o | 13 | o |
| Example 1a | 31.8 | 9.1 | Xylene | 22.7 | 0.623 | 0.512 | 82.2 | o | 13 | o |
| Example 1b | 40.9 | 9.1 | Xylene + Toluene | 31.8 | 0.623 | 0.508 | 81.2 | o | 13 | o |
| Example 1c | 54.5 | 9.1 | Xylene + Toluene | 45.5 | 0.623 | 0.524 | 84.1 | o | 17 | o |
| Comparative Example 1c | 63.6 | 9.1 | Xylene | 54.5 | 0.623 | | | x | Unable to Coat | |

TABLE 2

| | Sheet Property | | | | | | |
|---|---|---|---|---|---|---|---|
| | 10 μm Pressure Loss [Pa] | Air Permeability Evaluation [o or x] | Strength [MPa] | Strength Evaluation [o or x] | ρg [g/cm3] | ρg Evaluation [o or x] | Comprehensive Evaluation [o or x] |
| Comparative Example 1a | 42130 | x | 7.3 | x | 3.46 | x | x |
| Comparative Example 1b | 35240 | x | 5.5 | o | 3.41 | x | x |
| Example 1a | 26022 | o | 5.4 | o | 3.25 | o | o |
| Example 1b | 21579 | o | 5.3 | o | 3.23 | o | o |
| Example 1c | 10620 | o | 4.3 | o | 3.01 | o | o |
| Comparative Example 1c | | | | | | | x |

Production of Green Sheet

The slurry obtained as above was coated on a PET film (carrier sheet) as a support film by a wire bar-coater and dried, and a thickness of the sheet able to be coated was measured. As shown in Table 1, a green sheet having a thickness of 13 μm after drying could be produced.

Evaluation of Green Sheet

On the produced green sheets, a 10 μm pressure loss was measured to evaluate the air permeability as shown in Table 2. Also, tensile strength of the sheets was measured to evaluate the strength. Furthermore, sheet density (pg) was measured to evaluate the density. Then, based on the evaluation results, comprehensive evaluation was made.

The 10 μm pressure loss was evaluated by applying an air pressure of 42600 Pa to 2.5 cm square on doubled sheets having a thickness of 5 μm and adjusting a flowing amount to be 1 litter/min., and an amount of decreased pressure via the sheet was measured and evaluated. Those exhibited a result of 29000 Pa were evaluated to be good (o) and others were evaluated to be defective (x) in the air permeability evaluation.

The sheet tensile strength was obtained by using a tensile testing device 5543 of Instron Corporation, preparing 5 samples of sheets cut out to be a dumbbell shape, drawing each sample at a tensile speed of 8 mm/min., obtaining strength (MPa) at breaking and calculating the average-value. Since it is preferable that a thick film green sheet is easily cut, the tensile strength of the sheet is preferably 6 MPa or smaller. Those satisfying the criteria were evaluated good (o), and others were evaluated defective (x).

The sheet density (g/cm$^3$) was calculated from a measurement value of weight and volume of the sheet. When the sheet density becomes higher than 3.3 g/cm$^3$, adhesiveness of the sheet declines and stacking as shown in FIG. 3 becomes difficult. Therefore, those with density lower than 3.3 g/cm$^3$ were evaluated good (o) and others were evaluated defective (x).

In the comprehensive evaluation, those evaluated good (o) in all results of the filtering characteristics, applying thickness evaluation, air permeability evaluation, tensile evaluation and density evaluation were evaluated good, and those having (x) in any of the evaluations were evaluated defective (x). The results are shown in Table 2.

Example 1b

Instead of using only xylene as a solvent having a high boiling point as a part of the poor solvent, xylene and toluene were added in an amount of 31.8 wt % with respect to the entire solvent and an amount of the poor solvent composed of MSP, xylene and toluene was made to be 40.9 wt % with respect to the entire solvent. Other than that, ceramic slurry and a green sheet were produced in the same way as in the example 1a and evaluations were made in the same way. The results are shown in Table 1 and Table 2.

Example 1c

Instead of using only xylene as a solvent having a high boiling point as a part of the poor solvent, xylene and toluene were added in an amount of 45.5 wt % with respect to the entire solvent and an amount of the poor solvent composed of MSP, xylene and toluene was made to be 54.5 wt % with respect to the entire solvent. Other than that, ceramic slurry and a green sheet were produced in the same way as in the example 1a and evaluations were made in the same way. The results are shown in Table 1 and Table 2.

Comparative Example 1a

An average particle diameter d50 of BaTiO$_3$ as a base material before being dispersed in the slurry was 0.608 μm and an average particle diameter d50 of BaTiO$_3$ as a result of mixing by a ball-mill was 0.486 μm, so that the pulverization condition was that a ratio of d50 after mixing to that before mixing becomes 79.9%. MSP was in an amount of 6.3 wt % and xylene was 14.1 wt % with respect to the entire solvent, and the poor solvent composed of the MSP and xylene was made to be 20.3 wt % with respect to the entire solvent. Other than the above, ceramic slurry and a green sheet were produced in the same way as in the example 1a and evaluations were made in the same way. The results are shown in Table 1 and Table 2.

Comparative Example 1b

Other than changing an amount of xylene to 18.2 wt % with respect to the entire solvent and an amount of the poor solvent composed of MSP and xylene to 27.3 wt % with respect to the entire solvent, ceramic slurry and a green sheet were produced in the same way as in the example 1a and evaluations were made in the same way. The results are shown in Table 1 and Table 2.

Comparative Example 1c

Other than changing an amount of xylene to 54.5 wt % with respect to the entire solvent and an amount of the poor solvent composed of MSP and xylene to 63.6 wt % with respect to the entire solvent, ceramic slurry and a green sheet were produced in the same way as in the example 1a and evaluations were made in the same way. The results are shown in Table 1 and Table 2.

Evaluation

As shown in Table 1 and Table 2, it was confirmed that, when MSP and a solvent having a high boiling point as the poor solvent are included in a range of 30 to 60 wt % with respect to the entire solvent, the comprehensive evaluation became preferable and a thick film green sheet could be formed. It was also confirmed that a green sheet to be formed by using the thick film green sheet slurry of the present examples had improved air-permeability, cutting property and adhesiveness, and handleability of the thick film green sheet also improved. Accordingly, it was confirmed that production of a thick film green sheet became easy and production of an electronic device produced by using the thick film green sheet became easy.

It was also confirmed that, as shown in Table 1 and Table 2, in the case of mineral spirit alone, it is preferably included in a range of larger than 7% and smaller than 15%. When an adding quantity of MSP was too small, it was confirmed that the air permeability tended to be declined.

Furthermore, as shown in Table 1 and Table 2, by including the poor solvent as the solvent, pulverization up to 80% of the base material (slurry/base material in Table 1) became permissive, and it was confirmed that a step of dispersing the ceramic powder in the slurry became easy.

As explained above, according to the present invention, it is possible to provide a thick film green sheet slurry, a production method of thick film green sheet slurry, a production method of a thick film green sheet, a thick film green sheet and a production method of an electronic device: by which coating of a relatively thick film becomes possible, a sheet formed after coating has excellent cutting property (strength capable of being cut), and it is possible to form a sheet having high air permeability, excellent handleability and a high adhesive force.

The invention claimed is:

1. A thick film green sheet slurry comprising a first ceramic powder, a binder resin including a butyral based resin as a main component, and a solvent, wherein:
   said solvent includes a good solvent, well dissolving said binder resin, and a poor solvent having a lower solubility to said binder resin comparing with that of said good solvent;
   said poor solvent is included in a range of 30 to 60 wt % with respect to the entire solvent; and
   a mineral spirit is included in a range of larger than 7% but less than 15% in said poor solvent with respect to the entire solvent.

2. The thick film green sheet slurry as set forth in claim 1, wherein said poor solvent includes a solvent having a higher boiling point than that of said good solvent.

3. The thick film green sheet slurry as set forth in claim 1, wherein said good solvent is alcohol, and said poor solvent includes at least one of toluene, xylene, benzyl acetate, solvent naphtha, industrial gasoline, kerosene, heptanone and ethylbenzene other than said mineral spirit.

4. The thick film green sheet slurry as set forth in claim 1, wherein
said butyral based resin is a polyvinyl butyral resin; and
a polymerization degree of said polyvinyl butyral resin is 1000 or higher and 1700 or lower, a butyralation degree of the resin is higher than 64% and lower than 78%, and a residual acetyl amount is lower than 6%.

5. The thick film green sheet slurry as set forth in claim 1, wherein said binder resin is included in an amount of 4 to 6.5 parts by weight with respect to 100 parts by weight of said ceramic powder.

6. A production method of the thick film green sheet slurry as set forth in claim 1, wherein:
the first ceramic powder is pulverized, so that an average particle diameter of the first ceramic powder after being dispersed in said thick film green sheet slurry does not become smaller than 80% with respect to an average particle diameter of the first ceramic powder before being dispersed in said thick film green sheet slurry.

7. A production method of a thick film green sheet, comprising the steps of:
preparing the thick film green sheet slurry as set forth in claim 1; and
forming a thick film green sheet by using said thick film green sheet slurry.

8. A thick film green sheet produced by using the thick film green sheet slurry as set forth claim 1.

9. A production method of a ceramic electronic device, comprising the steps of:
preparing the thick film green sheet slurry as set forth claim 1;
forming an outer green sheet by using said thick film green sheet slurry;
preparing thin film green sheet slurry including a same kind of binder resin as the binder resin included in said thick film green sheet slurry;
forming an inner green sheet that is thinner than said outer green sheet by using said thin film green sheet slurry;
obtaining a multilayer body by stacking said inner green sheets via internal electrode layers;
obtaining a green chip by stacking said outer green sheet on both end surfaces in a stacking direction of said multilayer body; and
firing said green chip.

10. The production method of the ceramic electronic device as set forth in claim 9, wherein said thin layer green sheet slurry includes a same kind of second ceramic powder as the first ceramic powder included in said thick film green sheet slurry.

11. The production method of the ceramic electronic device as set forth in claim 9, wherein an average particle diameter of the second ceramic powder included in said thin film green sheet slurry is smaller than an average particle diameter of the first ceramic powder included in said thick film green sheet slurry.

12. The production method of the ceramic electronic device as set forth in claim 11, further comprising the steps of:
pulverizing the first ceramic powder, so that an average particle diameter of the first ceramic powder after being dispersed in said thick film green sheet slurry does not become smaller than 80% with respect to an average particle diameter of the first ceramic powder before being dispersed in said thick film green sheet slurry; and
pulverizing the second ceramic powder, so that an average particle diameter of the second ceramic powder after being dispersed in said thin film green sheet slurry becomes 80% or smaller with respect to an average particle diameter of the second ceramic powder before being dispersed in said thin film green sheet slurry.

* * * * *